United States Patent [19]

Tisone

[11] Patent Number: 4,609,009

[45] Date of Patent: Sep. 2, 1986

[54] STEPPED PLENUM SYSTEM

[75] Inventor: Robert W. Tisone, Sykesville, Md.

[73] Assignee: Environmental Elements Corp., Baltimore, Md.

[21] Appl. No.: 807,760

[22] Filed: Dec. 11, 1985

[51] Int. Cl.⁴ .............................................. B01D 45/00
[52] U.S. Cl. .................................... 137/561 A; 55/344
[58] Field of Search ............... 137/561 R, 561 A, 883; 55/344

[56] References Cited

U.S. PATENT DOCUMENTS

| | | | |
|---|---|---|---|
| 2,723,680 | 11/1955 | Danel | 137/561 A |
| 2,946,345 | 7/1960 | Weltmer | 137/590 |
| 3,037,629 | 6/1962 | Fontein et al. | 137/561 R |
| 3,650,292 | 3/1972 | Platz et al. | 137/561 A |
| 3,724,522 | 4/1973 | Pogson | 137/561 A |
| 3,736,955 | 6/1973 | Schlesser | 137/561 A |
| 3,794,056 | 2/1974 | Warren | 137/561 A |

FOREIGN PATENT DOCUMENTS

| | | | |
|---|---|---|---|
| 3106822 | 10/1982 | Fed. Rep. of Germany | 137/561 A |
| 18745 | of 1895 | United Kingdom | 137/561 A |

Primary Examiner—Alan Cohan
Assistant Examiner—John A. Rivell

[57] ABSTRACT

A stepped plenum system is provided for distributing particulate laden gas to a plurality of filter bags in a baghouse under substantially equal flow rate and pressure conditions. The stepped plenum system includes an inlet conduit and a plurality of outlet conduits. Gas is inserted into the inlet cross-sectional area of the inlet conduit and is directed to the outlet conduits through a stepped pattern design. The first outlet conduit and the second outlet conduit are in fluid communication with the inlet conduit. The second outlet conduit is longitudinally displaced from the first outlet conduit and provides for a second flow region which is of lower cross-sectional flow area than an initial flow region of the inlet conduit. Each of the outlet conduits include a plurality of inlet vane members which capture and redirect the flow of the gases into a direction which channels the gaseous flow into the respective outlet conduits. Outlet vane members are provided at the outlet sections of the outlet conduits to further pattern the flow egressing from the outlet conduits into a filter bag area within the baghouse compartment. Through use of stepped plenum system, there is provided a system whereby the particulate laden gas is equally distributed to the outlet conduits, differences in back pressure are minimized between the respective outlet conduits and in combination with the inlet and outlet vane members, that vortexes and turbulent conditions are minimized in the gaseous flow stream.

20 Claims, 3 Drawing Figures

STEPPED PLENUM SYSTEM

BACKGROUND OF THE INVENTION

1. Field of the Invention

This invention is directed to filtering systems. In particular, this invention directs itself to a stepped plenum system wherein particulate laden gas may be equally passed to a plurality of filter bags within a baghouse compartment. Still further, this invention pertains to a stepped plenum system whereby particulate laden gas may be equally distributed in both flow rate and pressure drop conditions in a substantially equal manner to a multiplicity of filter bag systems. More in particular, this invention directs itself to a stepped plenum system wherein there is provided an inlet conduit having a plurality of outlet conduits in fluid communication with the inlet conduit. More in particular, outlet conduits are arranged in a longitudinally displaced manner each with respect to the other and defining stepped flow regions wherein a portion of the inlet gas is diverted from the inlet conduit to the outlet conduits in a stepped manner. Further, this invention relates to a stepped plenum system wherein there are provided a plurality of outlet conduits in fluid communication with an inlet conduit having a multiplicity of vane members at the inlet and outlet sections of the outlet conduits to provide for even distribution and patterning of gaseous flow passing therethrough.

2. Prior Art

Filtering systems using fabric filter bags for filtering particulate matter from gaseous streams is well-known in the art. Additionally, systems have been developed to try to equalize the flow rate and pressure drops through the filter bags in baghouses. However, the prior flow equalizing systems have not been overly effective resulting in serially connected filter bags having differing flow rates as well as differing pressure drops therethrough. Such has resulted in different filter bags accomodating more of the flow rate and having a resulting lower lifetime than other filter bags in an overall system. This has resulted in unscheduled and unwanted replacing of some filter bags in an overall system while other filter bags are essentially still operational. Thus, deleterious effects result from down time of the operational system and increases the labor costs associated with the replacement of certain filter bags in an overall system at unscheduled times. The equalization of flow rate has been seen as a major cost of operation of filtering systems of the filter bag type.

Previous attempts to equalize the flow rate has been directed generally to utilizing a tapering inlet duct system. However, it has been found that in tapered design systems, poor flow patterns are found due to the unvaned turn from a tapered plenum to individual modules. Such flow patterns have been found to cause vortices as such enter hopper areas of the filtering systems and such increase both mechanical pressure losses and also provides a potential for erosion of the fabric at the bottoms of the filter bags.

The closest prior art known to Applicants include the following U.S. Pat. Nos.: 1,816,064; 2,370,444; 2,439,850; 2,904,130; 2,717,054; 3,543,931; 2,768,744; 2,209,339; 2,866,518; 2,995,207; 2,867,290; 2,696,895; and, 2,433,774.

U.S. Pat. Nos. 1,816,064 is directed to a filtering system, and there are provided lengths of the filtering elements in a somewhat stepped type configuration. The air to be cleaned is emitted at a lower end of the tubular filtering elements which are seen to be mounted in stepped relation within the housing, however, such does not provide a stepped type inlet and outlet duct system, as is provided in the subject invention concept.

Reference U.S. Pat. No. 2,439,850 is directed to a system which is used in the manufacturing of carbon black. They do provide a main duct which leads from the source of the suspension to be separated with ducts coupled to the main duct in a somewhat stepped relation for entrance into respective separator units. However, once again, there is not provided the stepped type pattern between inlet and outlet ducts, as shown in the subject invention concept for the flow pattern equalization as provided.

SUMMARY OF THE INVENTION

A stepped plenum system for substantially equalizing flow rate of fluid through a plurality of longitudinally displaced outlet conduits. The stepped plenum system includes an inlet conduit which extends in the longitudinal direction and has a substantially constant inlet cross-sectional flow area defining a first flow region. There is further provided a first outlet conduit in fluid communication with the inlet conduit and at least a second outlet conduit which is also in fluid communication with the inlet conduit. The second outlet conduit is longitudinally displaced from the first outlet conduit and defines a second flow region therebetween. The second flow region has a substantially constant cross-sectional flow area in the longitudinal direction which is less than the inlet cross-sectional flow area.

DESCRIPTION OF THE PREFERRED EMBODIMENTS

Figure 1:
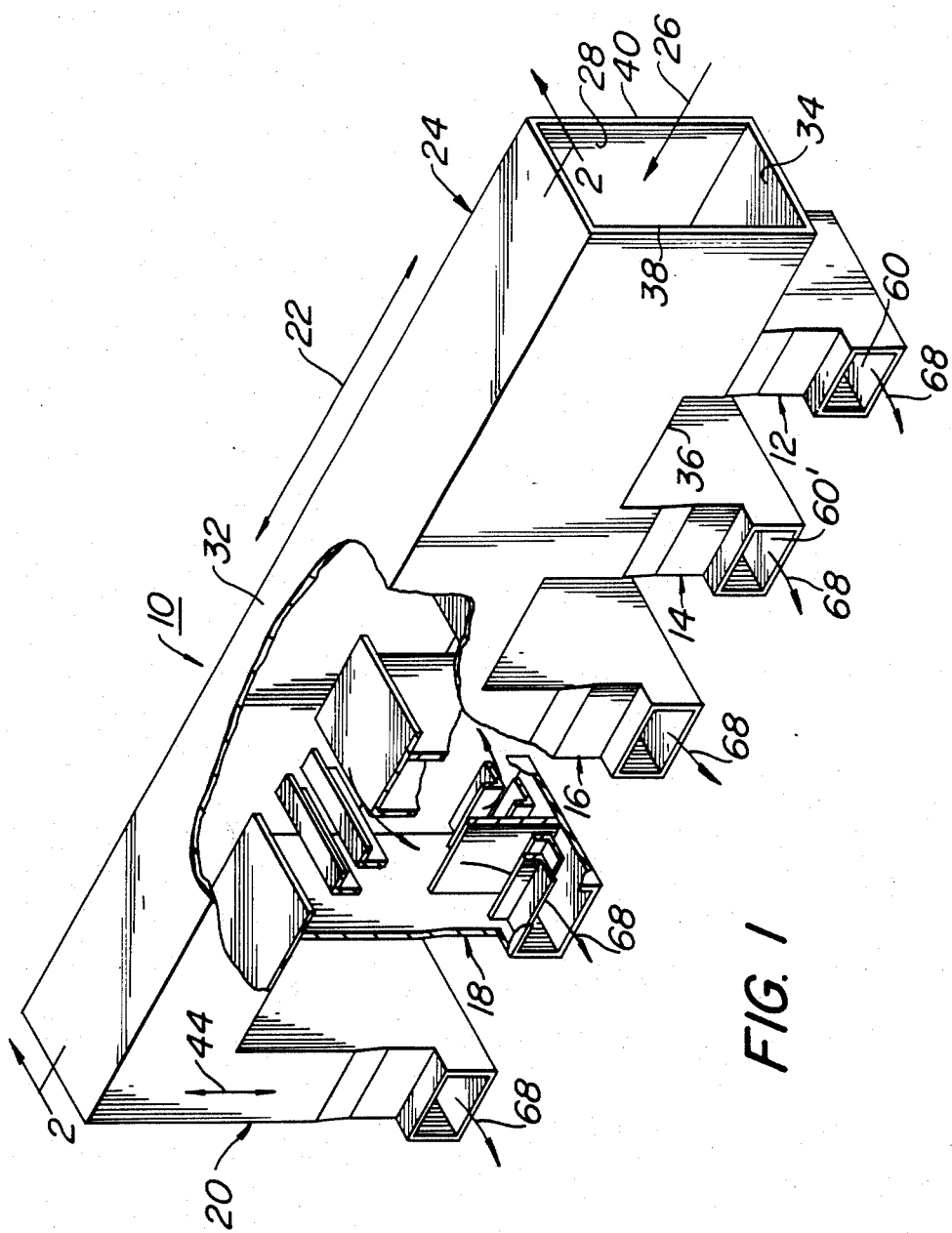
FIG. 1 is a perspective view partially in cutaway of the stepped plenum system.
Figure 2:
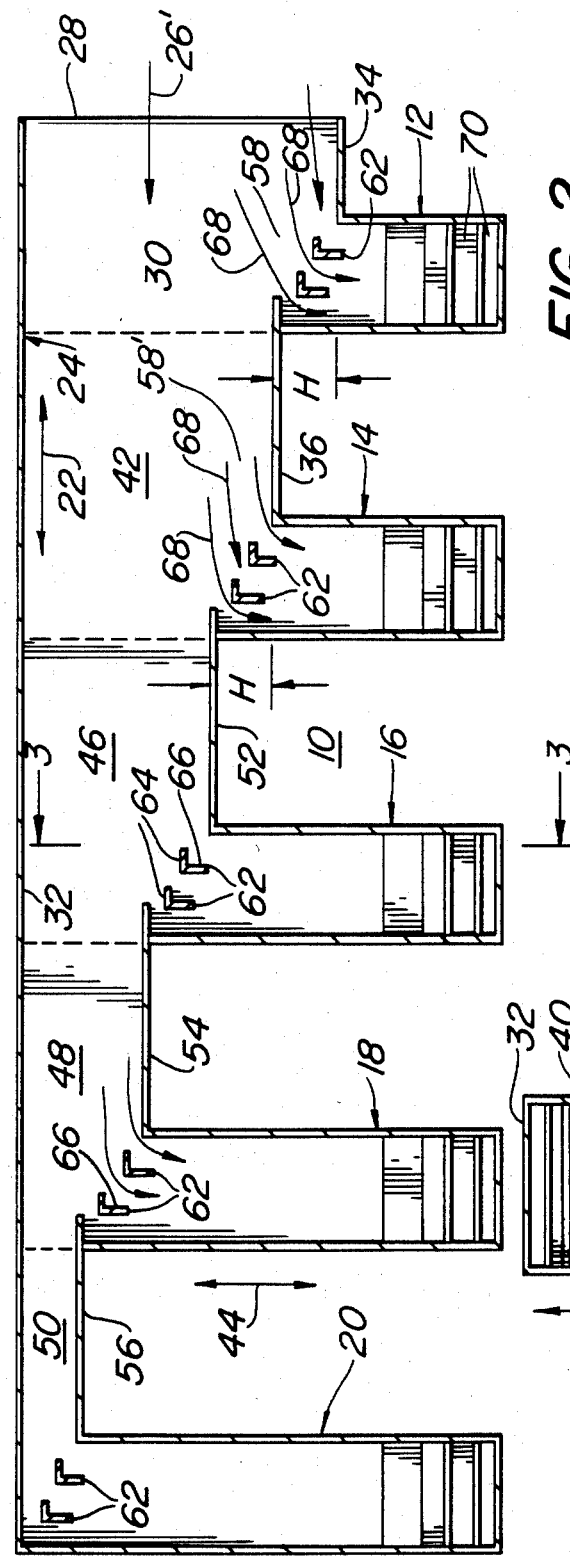
FIG. 2 is a cross-sectional view of the stepped plenum system taken along the Section Line 2—2 of FIG. 1; and, FIG. 3 is a sectional view of the stepped plenum system taken along the Section Line 3—3 of FIG. 2.
Figure 3:
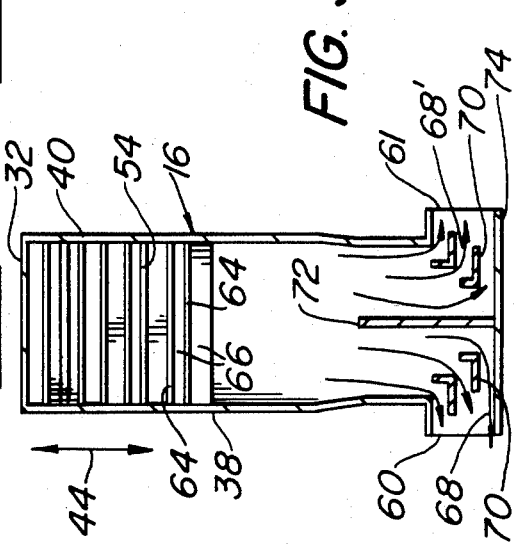

Referring now to FIGS. 1-3, there is shown stepped plenum system 10 of particular use in the fabric filter industry having baghouses which take large volumes of gas and distribute it to a plurality of modules or compartments. In baghouses, there generally are a plurality of fabric cloth bags through which particulate laden gas is passed. In general, a number of filter bags are used to collect particulates such as flyash, coal, particulate contaminants from a particular environment, as well as other particles being filtered from a gas stream. When there are a plurality of filter bags having such gases passed therethrough, the filter bags are generally aligned in a serial direction and one of the great problems is distributing the gases under equal pressure and equal flow rate to each of the filter bags.

Existing fabric filter systems have generally experienced poor gas distribution between modules or compartments with high pressure losses. As has been stated, the present method of distributing the particulate laden gas to various compartments and filter bags has been through the use of tapered inlet and outlet ducts. Unfortunately, these types of systems have inherent flow and pressure drop problems and rely on back pressure generated by the mechanical and fabric losses of individual compartments or modules to distribute the gas. Thus, stepped plenum system 10 has been developed in order to overcome the pressure drop, flow characteristic, and equalization of gas flow rate between and passing through fabric filter bags in a baghouse system. As is evident, where a large number of filter bags are coupled in line or in parallel, and there is a discrepancy in the flow rate passing through the bags, such dictates that certain bags in the system will have differing lifetimes for collecting the particulate matter and such will increase the costs of operation due to the fact that various filter bags must be replaced at different times while other filter bags may remain on-line.

Stepped plenum system 10 substantially equalizes the flow rate of a fluid or gas through a plurality of longitudinally displaced outlet conduits 12, 14, 16, 18 and 20. As shown for illustrative purposes only, stepped plenum system 10 includes five outlet conduits, however, it is to be understood that it is within the scope of this inventive concept that more or less outlet conduits are utilizable, with the exception that there be at least first outlet conduit 12 and second outlet conduit 14 in stepped plenum system 10. In following paragraphs, full descriptions of first and second outlet conduits 12 and 14 shall be provided, with the understanding that the same relationships and elements associated with first and second outlet conduits 12 and 14 are applicable to the remaining outlet conduits in a particular stepped plenum system 10.

Stepped plenum system 10 includes inlet conduit 24 which extends in longitudinal direction 22 as is seen in FIGS. 1 and 2. Inlet conduit 24 is herein defined as the entire extension length of stepped plenum system 10 being in fluid communication with each of outlet conduits 12, 14, 16, 18, and 20. Inlet conduit 24 accepts particulate laden gas flowing in initial gas direction 26 and provides for a substantially constant inlet cross-sectional flow area 28 defining first flow region 30, shown in FIG. 2.

Inlet conduit 24 includes a substantially horizontally directed upper wall member 32, as well as first flow region lower wall member 34 and second flow region lower wall member 36. Inlet conduit 24 further includes opposing transversely displaced sidewalls 38 and 40, as is clearly shown in FIG. 1. Second flow region 42 is clearly seen in FIG. 2 and is defined by the volume of inlet conduit 24 subsequent to the passage of the gas in longitudinal direction 22 past first outlet conduit 12 and prior to insertion of a portion of the flowing gas into second outlet conduit 14.

First and second flow region lower wall members 34 and 36 are displaced each from the other in vertical direction 44 as is seen in FIGS. 1 and 2, and further are positionally located in longitudinal displacement as well as in stepped relation each with respect to the other. In similar manner to first and second flow regions 30 and 42, third flow region 46 extends between second outlet conduit 14 and outlet conduit 16, a fourth flow region 48 extends between outlet conduit 18 and fifth flow region 50 encompasses the inlet conduit volume between outlet conduit 18 and outlet conduit 20.

As can be seen in FIG. 1, inlet conduit upper wall member 32 in combination with opposing transversely displaced sidewalls 28 and 38 and further in combination with first and second flow region lower wall members 34 and 36 as well as lower wall members 52, 54 and 56 define generally rectangular cross-sectional areas for gas flow in generally longitudinal direction 22, as such passes through stepped plenum system 10.

As can be seen in FIGS. 1 and 2, first outlet conduit 12 is in fluid communication with inlet conduit 24. Second outlet conduit 14 is further in fluid communication with inlet conduit 24 and first and second outlet conduits 12 and 14 are longitudinally displaced each from the other defining second flow region 42 therebetween. Second flow region 42 also provides for a substantially constant cross-sectional flow area when taken with respect to longitudinal direction 22 and due to the stepped relation previously described, the cross-sectional area of second flow region 42 is clearly less than inlet cross-sectional flow area 28. Each of first and second outlet conduits 12 and 14 includes respective inlet flow sections 58 and 58' as well as respective outlet flow sections 60 and 60'. Each of inlet sections 58 and 58' are in fluid communication and contiguous inlet conduit 24.

Stepped plenum system 10 further includes the mechanism for equalizing flow rate of fluid throughout a fluid flow cross-sectional area of each of first and second outlet conduits 12 and 14. The same mechanism as will be described in following paragraphs for first and second outlet conduits 12 and 14 obviously applies to the remaining outlet conduits in system 10, such as 16, 18 and 20. The mechanism for equalizing the flow rate of fluid passing into conduits 12 and 14 as well as minimizing vortexing of the gaseous flow in combination with developing appropriate and applicable pressure drops includes a multiplicity of inlet vane members 62 mounted to opposing transversely displaced sidewalls 38 and 40 of each of first and second outlet conduits 12 and 14 at inlet sections 58 and 58', respectively. Inlet vane members 62 may be fixedly secured to opposing transversely displaced sidewalls 40 and 38 through welding, bolting, or some like mechanism, not important to the inventive concept as herein described.

Inlet vane members 62 are positionally located in inlet sections 58 and 58' of outlet conduits 12 and 14 in a predetermined manner for redirecting longitudinally directed gas flow in longitudinal direction 22 within inlet conduit 24 to a direction defined by the extended length of each of outlet conduits 12 and 14 generally in vertical direction 44. As can be seen, the multiplicity of inlet vane members 62 in each of outlet conduits 12 and 14 are both longitudinally and vertically displaced each with respect to the other in inlet sections 58 and 58' of each of outlet conduits 12 and 14.

Inlet vane members 62 are generally contoured in an inverted L-shaped contour having horizontally directed leading leg members 64 and vertically directed trailing leg members 66. Horizontally directed leading leg members 64 and vertically directed trailing leg members 66 may be formed in one piece formation, or otherwise secured each to the other in a manner to deflect the flow of particulate gases as is shown by the gas flow directional arrows 68 in FIG. 2.

Particulate laden gas entering inlet conduit 24 may be under high velocity rate ranges such as in the range of 3600.0 feet per minute. The sizing and dimensional consideration of inlet vane members has been found to be optimized within certain parameter ranges as provided by the following approximating formulas for both the length of vertically directed trailing leg members 66 and horizontally directed leading leg members 64. Thus, in a preferred embodiment of stepped plenum system 10, vertically directed trailing leg members 66 of each of inlet vane members 62 has a vertical dimension in accordance with the approximating formula:

$$\frac{H}{(N_v + 1)} (1.1) \leq a \leq \frac{H}{(N_v + 1)} (1.4) \quad (1)$$

where:
H=Difference in height between said first flow region lower wall member and said second flow region lower wall member (in.)
$N_v$=Number of said inlet vane members in an inlet section of one of said outlet conduits (dimensionless)
a=Vertical length of said trailing leg member of said inlet vane member (in.)

Similarly, horizontally directed leading leg members 64 of inlet vane members 62 have a preferred longitudinal extension in accordance with the approximating formula:

$$b = \frac{W}{(N_v + 1)} \quad (2)$$

where:
b =Longitudinal length of said leading leg member (in.)
$N_v$=Number of said inlet vane members in an inlet section of one of said outlet conduits
W=Extended length of cross-sectional area of said outlet conduit normal to the flow through said outlet conduit (in.)

As can be seen in FIG. 1, outlet conduits 12, 14, 16, 18, and 20 are generally contoured to provide an egress fluid flow direction 68 from outlet conduits 12, 14, 16, 18, and 20 out of plane with respect to inlet conduit flow direction 22 and in a different flow direction with respect to inlet conduit flow direction 22. As can be further seen, egress flow direction 68 is substantially normal to (1) flow direction in outlet conduits 12-20 and (2) flow direction in inlet conduit 24. Thus, for the embodiments shown in FIGS. 1-3, egress flow direction 68 is caused by two 90° turns of the initial gas inlet flow direction 26.

Each of outlet conduits 12-20 further provides for a means of equalizing the flow rate of fluid passing in egress direction 68 in outlet sections 60. As previously described for inlet sections 58, 58', the mechanism for equalizing the flow rate in outlet sections 60, 60' of outlet conduits 12 and 14 includes a plurality of outlet vane members 70 mounted to opposingly displaced sidewalls of each of outlet conduits 12 and 14, as well as the remaining outlet conduits.

In some cases, flow through outlet conduits 12-20 may be directed in opposing paths upon egress from a respective outlet conduit. This case is clearly seen in FIG. 3, where there is shown barrier member 72 for channeling egressing fluid flow in opposing directions from outlet conduits such as outlet conduits 12 or 14. Barrier member 72 may be mounted in fixed relation to lower wall 74 through welding or some like technique, not important to the inventive concept as herein defined. Additionally, barrier member 72 may extend in vertical direction 44 and provides some type of channeling for egress through opposing outlet sections 60 and 61 as is seen in FIG. 3. It will be noted that outlet vane members 70 are positionally located on opposing sides of barrier member 72. Outlet vane members 70 may be fixedly secured to opposing displaced sidewalls of outlet conduits 12-20 through welding, bolting, or some like technique, and extend in a direction substantially normal the flow direction of the particulate laden gas in a respective outlet conduit for the purpose of channeling and equalizing the flow rate of the fluid in a predetermined manner as previously described.

Outlet vane members 70 generally include an L-shaped contour having both vertically directed leading leg members and substantially horizontally directed trailing leg members fixedly secured to each other in one-piece formation or through bolting, welding, or some further like technique. Sizing of vertically directed leading leg members and horizontally directed trailing leg members of outlet vane members 70 may be sized in accordance with the equations (1) and (2) however, such is only approximating in nature.

Through use of stepped plenum system 10, there is provided a proper pattern of gas flow wherein it has been found that the full width and height of inlet conduit 24 is being utilized. Pressure loss is minimized since flow is evenly distributed throughout the ducting system. Pressure drop or pressure losses are generally created when one portion of a conduit has a higher velocity than another. Such creates turbulence and eddies. Once a balanced flow is provided through outlet ducts 12-20, there is now distributed the gas flow throughout the full width of the overall stepping pattern into the elbow sections. If vane members 62 were not provided, gas flow would possibly be in a non-equalized flow pattern through respective regions 42, 46, 48, and 50. Outlet vane members 70 provide for a continuous pattern distribution throughout the cross-sectional egress area of each of outlet conduits 12-20. Where lower outlet vane members 70 were not included, the flow pattern would dictate that the flow would go to the lower walls 74 and a turbulence would occur, wherein the flow would try to pass through the path of least resistance and essentially back up on itself within a respective outlet conduit, such as 12 and 14.

It is to be understood that stepped plenum system 10 may be used as an outlet plenum as well as an inlet plenum. Where system 10 is used as an outlet plenum, it is obvious to those skilled in the art that flow direction will be opposite to that shown in the Figure.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:
1. A stepped plenum system for substantially equalizing flow rate of a fluid through a plurality of longitudinally displaced outlet conduits, comprising:
(a) an inlet conduit extending in said longitudinal direction having a substantially constant inlet cross-sectional flow area defining a first flow region;
(b) at least a first outlet conduit in fluid communication with said inlet conduit; and,
(c) at least a second outlet conduit in fluid communication with said inlet conduit, said second outlet conduit being longitudinally displaced from said first outlet conduit and defining a second flow region therebetween, said second flow region having a substantially constant cross-sectional flow area in said longitudinal direction and less than said inlet cross-sectional flow area.

2. The stepped plenum system as recited in claim 1 where said inlet conduit includes a substantially horizontally directed upper wall member, a first flow region lower wall member, and a second flow region lower wall member, said first and second flow region lower wall members being vertically displaced with respect to said upper wall member and positionally located in stepped relation each with respect to the other.

3. The stepped plenum system as recited in claim 2 where each of said first and second outlet conduits includes an inlet and outlet flow section, each of said inlet sections being in fluid communication and contiguous said inlet conduit.

4. The stepped plenum system as recited in claim 3 including means for equalizing flow rate of said fluid throughout a fluid flow cross-sectional area of each of said first and second outlet conduits.

5. The stepped plenum system as recited in claim 4 where said mean for equalizing flow rate includes a plurality of inlet vane members mounted to opposing transversely displaced sidewalls of each of said first and second outlet conduits at said inlet sections thereof.

6. The stepped plenum system as recited in claim 5 where said inlet vane members are fixedly secured to said opposing transversely displaced sidewalls.

7. The stepped plenum system as recited in claim 5 where said inlet vane members are positionally located in said inlet sections of said outlet conduits in predetermined manner for redirecting said longitudinally directed flow in said inlet conduit to a direction defined by an extended length of each of said outlet conduits.

8. The stepped plenum system as recited in claim 5 where said inlet vane members are longitudinally and vertically displaced each with respect to the other in said inlet section of each of said outlet conduits.

9. The stepped plenum system as recited in claim 8 where each of said inlet vane members includes an inverted L-shaped contour having a horizontally directed leading leg member and a substantially vertically directed trailing leg member.

10. The stepped plenum system as recited in claim 9 where said vertically directed trailing leg member of each of said inlet vane members has a vertical length in accordance with the approximating formula:

$$\frac{H}{(N_v + 1)} (1.1) \leq a \leq \frac{H}{(N_v + 1)} (1.4)$$

where:

H = Difference in height between said first flow region lower wall member and said second flow region lower wall member (in.)

$N_v$ = Number of said inlet vane members in an inlet section of one of said outlet conduits (Dimensionless)

a = Vertical length of said trailing leg member of said inlet vane member (in.).

11. The stepped plenum system as recited in claim 10 where said horizontally directed leading leg member of each of said inlet vane members has a longitudinal extension in accordance with the approximating formula:

$$b = \frac{W}{(N_v + 1)}$$

where:

b = Longitudinal length of said leading leg member (in.)

$N_v$ = Number of said inlet vane members in an inlet section of one of said outlet conduits W = Extended length of cross-sectional area of said outlet conduit normal to the flow through said outlet conduit (in.)

12. The stepped plenum as recited in claim 4 where each of said outlet conduits is contoured to provide an egress fluid flow direction from said outlet conduits being out of plane with respect to said inlet conduit flow and in a different flow direction with respect to said inlet conduit flow direction.

13. The stepped plenum system as recited in claim 12 where said egress flow direction is substantially normal to (1) said flow direction in said outlet conduits, and, (2) said flow direction in said inlet conduit.

14. The stepped plenum system as recited in claim 12 where each of said outlet conduits includes means for equalizing flow rate of said fluid in an outlet section thereof.

15. The stepped plenum system as recited in claim 14 where said means for equalizing said flow rate in said outlet section of each of said outlet conduits includes a plurality of outlet vane members mounted to opposing displaced sidewalls of each of said outlet conduits.

16. The stepped plenum system as recited in claim 15 where at least one of said outlet conduits includes a substantially planar barrier member for channeling said egressing fluid flow in opposing directions from said outlet conduit.

17. The stepped plenum system as recited in claim 15 where said outlet vane members are fixedly secured to said opposing displaced sidewalls.

18. The stepped plenum system as recited in claim 15 where said outlet vane members extend in a direction substantially normal said flow direction in said outlet conduits.

19. The stepped plenum system as recited in claim 15 where each of said outlet vane members includes an L-shaped contour having a vertically directed leading leg member and a substantially horizontally directed trailing leg member.

20. The stepped plenum system as recited in claim 1 where said inlet conduit cross-sectional flow area and said second flow region cross-sectional flow areas are substantially rectangular in cross-sectional contour.

* * * * *